(12) United States Patent
Watanabe et al.

(10) Patent No.: US 7,749,649 B2
(45) Date of Patent: Jul. 6, 2010

(54) ELECTROCHEMICAL CELL HAVING CONTAINER WITH EMBEDDED POSITIVE ELECTRODE CURRENT COLLECTOR

(75) Inventors: Shunji Watanabe, Sendai (JP);
Yoshibumi Nakamura, Sendai (JP);
Hideharu Onodera, Sendai (JP); Tsugio Sakai, Sendai (JP); Kensuke Tahara, Sendai (JP)

(73) Assignee: Seiko Instruments Inc. (JP)

( * ) Notice: Subject to any disclaimer, the term of this patent is extended or adjusted under 35 U.S.C. 154(b) by 1120 days.

(21) Appl. No.: 11/021,067

(22) Filed: Dec. 23, 2004

(65) Prior Publication Data

US 2005/0158628 A1 Jul. 21, 2005

(30) Foreign Application Priority Data

Dec. 25, 2003 (JP) ............................. 2003-430343
Sep. 15, 2004 (JP) ............................. 2004-268915

(51) Int. Cl.
*H01M 2/06* (2006.01)
*H01M 2/02* (2006.01)
*H01M 2/04* (2006.01)
*H01M 4/66* (2006.01)

(52) U.S. Cl. .................... 429/176; 429/163; 429/175; 429/245

(58) Field of Classification Search ............ None
See application file for complete search history.

(56) References Cited

U.S. PATENT DOCUMENTS 3,697,328 A * 10/1972 Bilhorn ................ 29/623.3

| | | | |
|---|---|---|---|
| 5,066,556 A * | 11/1991 | Toyosawa et al. | 429/213 |
| 5,476,734 A | 12/1995 | Pulley et al. | 429/244 |
| 5,542,163 A | 8/1996 | Chang | 29/2 |
| 6,004,694 A * | 12/1999 | Van Lerberghe | 429/179 |
| 2001/0012193 A1 | 8/2001 | Watanabe et al. | 361/502 |
| 2002/0136946 A1 | 9/2002 | Amatucci et al. | 429/152 |

FOREIGN PATENT DOCUMENTS

| | | | |
|---|---|---|---|
| EP | 1091427 | | 4/2001 |
| JP | 62272458 | * | 11/1987 |
| JP | 03238770 | * | 10/1991 |
| JP | 2001/216952 | | 8/2001 |
| JP | 2001216952 A | * | 8/2001 |
| JP | 2002/117841 | | 4/2002 |
| JP | 2003/100300 | | 4/2003 |
| JP | 05290854 | | 11/2003 |
| WO | 03067683 | | 8/2003 |
| WO | WO03067683 | * | 8/2003 |

OTHER PUBLICATIONS

Machine Translation JP 2001-216952, Oct. 8, 2001, Watanabe et al.*

* cited by examiner

*Primary Examiner*—Dah-Wei D Yuan
*Assistant Examiner*—Katherine Turner
(74) *Attorney, Agent, or Firm*—Adams & Wilks

(57) ABSTRACT

An electrochemical cell has a container containing a positive electrode, a negative electrode, and an electrolyte. The container has a bottom face and a hole formed in the bottom face. A positive electrode current collector is embedded in the bottom face of the container so that the hole formed in the bottom face exposes a portion of the positive electrode current collector. A covering portion is adhered to the positive electrode and covers the exposed portion of the positive electrode current collector. The positive electrode current collector is electrically connected to the positive electrode via the covering portion. A lid seals the container.

24 Claims, 6 Drawing Sheets

ELECTROCHEMICAL CELL HAVING CONTAINER WITH EMBEDDED POSITIVE ELECTRODE CURRENT COLLECTOR

BACKGROUND OF THE INVENTION

1. Field of the Invention

The present invention relates to an electrochemical cell such as a non-aqueous electrolyte cell or an electric double-layer capacitor.

2. Description of the Related Art

An electrochemical cell has conventionally been used as, for example, a backup power supply for a clock function, a backup power supply for a memory of a semiconductor, a standby power supply for an electronic device such as a microcomputer or an IC memory, a cell for a solar watch or an electric power supply for driving a motor.

Although a button type electrochemical cell in disc form has been used in many occasions, when reflow soldering is performed on the electrochemical cell, it is necessary to previously weld a terminal or the like to a casing and, therefore, the number of parts is increased and production man-hour is also increased, to there by cause an increase of production cost. Further, it is necessary to provide a space for connecting the terminal on a substrate and, accordingly, there is a limitation on reduction of a size of the cell.

Still further, an improvement of thermal resistance is required in the electrochemical cell. This is because the electrochemical cell is mounted on the substrate by using reflow soldering. The term "reflow soldering" as used herein is intended to indicate a method of performing soldering by first applying in advance a solder cream or the like to a portion of a printed circuit board on which soldering is to be performed, next, placing a part on the portion, or, after the part is placed thereon, providing a small solder ball (solder bump) on the portion on which the soldering is to be performed and, then, passing the printed circuit board having the part thereon through a furnace which is set to have an atmosphere of high temperature inside such that the portion on which the soldering is to be performed is heated at a melting point or higher of solder, for example, a temperature in the range of from 200 to 260° C. allowing the solder to be melt.

In order to solve these problems, an electrochemical cell which uses a thermally resistant container as an outer sheath for containing an electrode and an electrolyte and is provided with a terminal has come to be studied (for example, refer to Patent Document 1).

Patent Document 1: JP-A No. 2001-216952 (Item Nos. 2 and 3; FIG. 1).

A problem to be solved by the present invention is that of dissolution of a positive electrode current collector.

A cross-sectional diagram of a conventional electrochemical cell is shown in FIG. 3.

In a case in which a material of a container 101 is prepared by using ceramics, the container 101 is made of ceramics such as alumina and is produced such that a green sheet is subjected to a printed-wiring treatment by using a metal having a high melting point such as tungsten, molybdenum, chromium, or alloys thereof and, then, fired.

On the side of a bottom face of the container 101, a positive electrode 106 is provided, and the positive electrode 106 is adhered to a positive electrode current collector 103 by using an electrically conductive adhesive 1111. The container 101 is sealed by a lid 102, and the container 101 and the lid 102 are joined to each other via a metallic ring 109. Further, a negative electrode 107 is adhered to the lid 102 by using an electrically conductive adhesive 1112. The positive electrode 106 and the negative electrode 107 are separated from each other by a separator 105. Still further, a connecting terminal A 1041 and a connecting terminal B 1042 are provided for connecting electrodes to an outside circuit.

However, when the conventional electrochemical cell is used at a relatively high voltage, for example, around 3 V, there is a problem in that the positive electrode current collector 103 which is in contact with the positive electrode is dissolved.

The reason is that, when the electrochemical cell is charged, a potential at the side of the positive electrode is elevated to a voltage of such an extent as dissolving the positive collector 103.

Under these circumstances, an object of the present invention is to provide an electrochemical cell which is easily produced, prevents dissolution of a positive electrode current collector and is capable of being used at a high voltage.

SUMMARY OF THE INVENTION

In an electrochemical cell according to the present invention, a positive electrode current collector and a positive electrode are not in contact with each other by covering the positive electrode current collector by means of a valve metal or carbon such that the positive electrode current collector is not dissolved even at a high voltage, to thereby prevent dissolution of the positive electrode current collector.

The electrochemical cell according to the present invention comprises a positive electrode, a positive electrode current collector covered by a covering portion comprising a valve metal or carbon and electrically connected to the positive electrode via the covering portion, a negative electrode, an electrolyte, a container storing the positive electrode, the negative electrode, and the electrolyte, and a lid for sealing the container. Further, any one of other metal layers may be interposed between the positive electrode current collector and the covering portion and, also, the positive electrode current collector may be plated by gold or nickel and, then, covered by the covering portion.

In the electrochemical cell, tungsten, molybdenum, chromium, or alloys thereof may be used in the positive electrode current collector.

The valve metal of the covering portion of the positive electrode current collector may be any one of aluminum, tantalum, niobium, titanium, hafnium and zirconium.

Further, in the electrochemical cell according to the present invention, a portion of the positive electrode current collector is embedded in the container and the other portion thereof which is not embedded in the container is covered by the covering portion.

Preferably, in the electrochemical cell according to the present invention, the covering portion and the positive electrode are adhered or connected to each other by an electrically conductive adhesive.

Preferably, in the electrochemical cell according to the present invention, an area of the positive electrode coated by the electrically conductive adhesive is larger than an area of the covering portion.

Further, the electrochemical cell in which the container is made of ceramics is also preferred.

By covering a surface of the positive electrode current collector by the valve metal, dissolution of the positive electrode is prevented, to thereby allow the electrochemical cell to be used at a high voltage. Further, by using a thermally resistant material in the container, thermal resistance is enhanced and, even though a reflow soldering is performed, characteristics of the electrochemical cell are not deteriorated, to thereby enhance reliability.

By using any one of aluminum, tantalum, niobium, titanium, hafnium and zirconium as the valve metal which covers the surface of the positive electrode current collector, dissolution of the positive electrode can be prevented and, then, the electrochemical cell can be used at a high voltage.

By embedding a portion of the positive electrode current collector in the container, a portion thereof to be covered becomes small and, accordingly, prevention of a film defect such as a pin-hole and a uniform covering are facilitated, to thereby enhance reliability. In a conventional method, it is difficult to cover the positive electrode current collector near to an outer wall of the container and, when the portion to be covered is off the position even to a small extent, there is a risk of allowing a portion of the positive electrode current collector to be exposed or to come in contact with the metallic ring or the joining material to cause an internal short circuit and, then, nullifying the function thereof. On the other hand, according to the present invention, even though the portion to be covered comes to be off the position to some extent, there is no risk of allowing a portion of the positive electrode current collector to be exposed or to come in contact with the metallic ring or the joining material and, accordingly, the positive electrode current collector can easily be covered.

Further, by adhering the covering portion and the positive electrode to each other by the electrically conductive adhesive, an internal resistance of the electrochemical cell becomes small, to thereby enhance characteristics of the electrochemical cell.

Still further, by allowing the area of the positive electrode to be coated by the electrically conductive adhesive to be larger than the area of the covering portion, a contact area of the positive active material comes to be large and, accordingly, the internal resistance of the electrochemical cell becomes smaller.

By using ceramics in the container, thermal resistance of the electrochemical cell is enhanced and, then, even though reflow soldering is performed, the characteristics of the electrochemical cell are not deteriorated, to thereby enhance reliability.

DETAILED DESCRIPTION OF THE PREFERRED EMBODIMENTS

Figure 1:
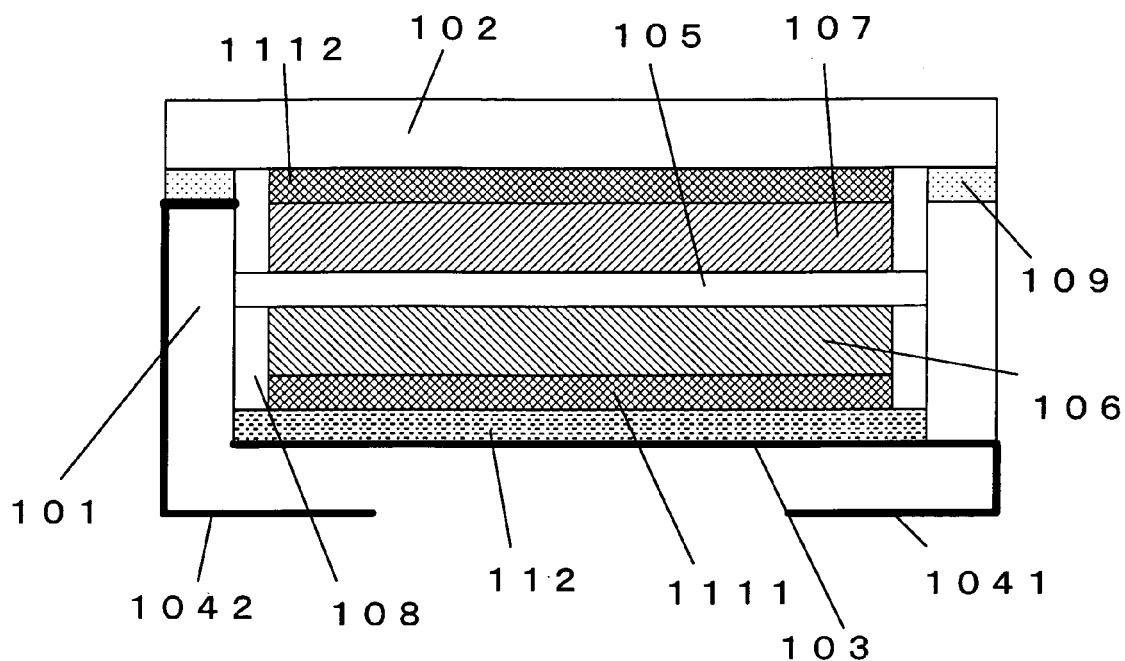
FIG. 1 is a cross-sectional diagram of an electrochemical cell according to the present invention.

A cross-sectional diagram of an electrochemical cell according to the present invention is shown in FIG. 1. A positive electrode 106 is provided on the side of a bottom face of a container 101. A covering portion 112 comprising a valve metal or carbon is formed on a surface of a positive electrode current collector 103 and the positive electrode 106 is adhered to the covering portion 112 by using an electrically conductive adhesive 1111. The positive electrode current collector 103 and the positive electrode 106 are electrically connected to each other via the electrically conductive adhesive 1111 and the covering portion 112.

A metallic ring 109 is provided on an upper portion of an outer wall of the container 101 and a joining material is provided on a surface of the metallic ring 109. The joining material is also provided on a surface of a lid 102 and melted to seal the container 101 and the lid 102 to each other. A negative electrode 107 is adhered to the lid 102 by an electrically conductive adhesive 1112. The lid 102 has electric conductivity and acts as a negative electrode current collector negative electrode current collector.

Further, the positive electrode 106 and the negative electrode 107 are separated from each other by a separator 105. Still further, another metal may be present between the positive electrode current collector and the covering portion 112 and the positive electrode current collector may be plated with gold or nickel and, thereafter, covered by the covering portion. An electrolyte 108 is filled inside the container 101.

Figure 2:
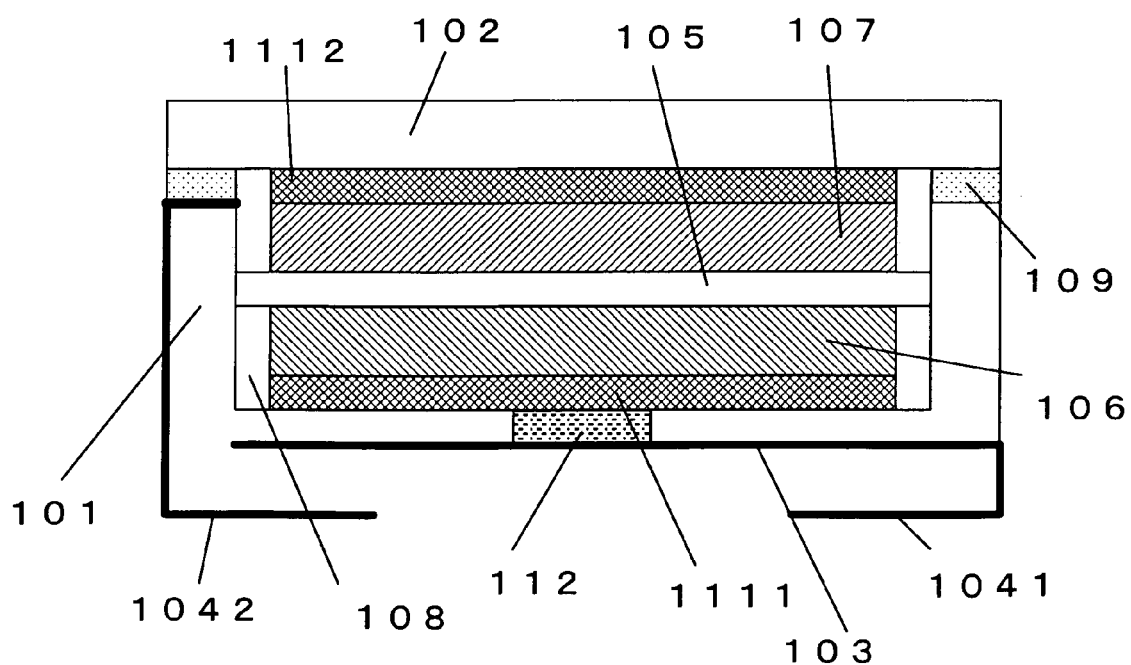
FIG. 2 is a cross-sectional diagram of an electrochemical cell according to the present invention.
Figure 3:
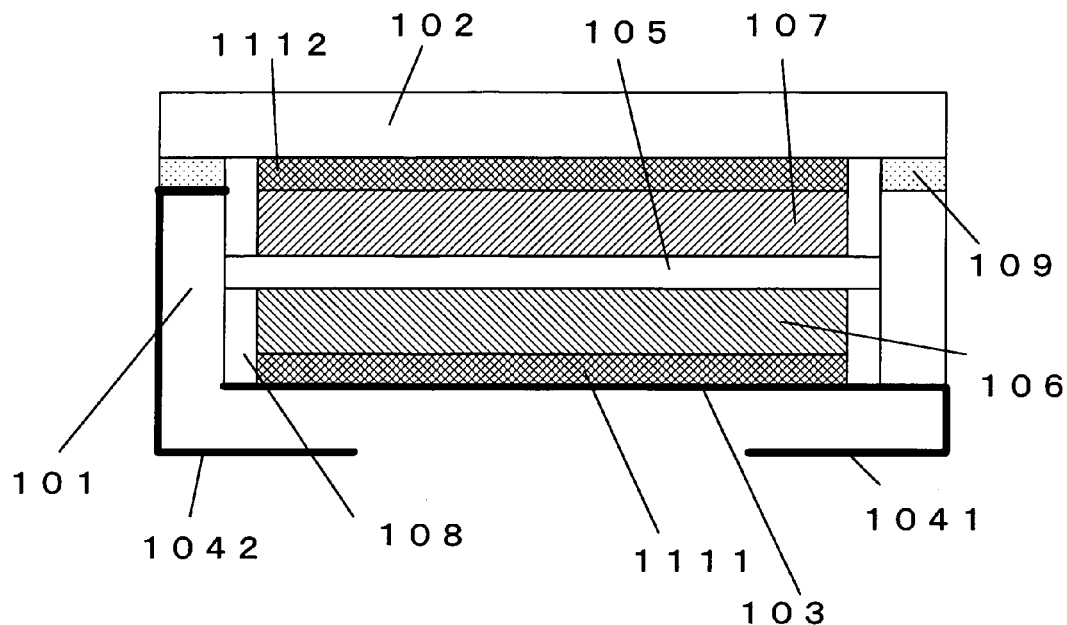
FIG. 3 is a cross-sectional diagram of a conventional electrochemical cell.

Next, a cross-sectional diagram of another electrochemical cell according to the present invention is shown in FIG. 2. When the container 101 according to the present invention is prepared by alumina, an alumina green sheet in square form which comes to be a bottom face is provided and, then, a surface of the thus-provided bottom face is subjected to tungsten print, to provide a portion of wiring of each of the positive electrode current collector 103, a connecting terminal A 1041 and a connecting terminal B 1042.

Figure 8:
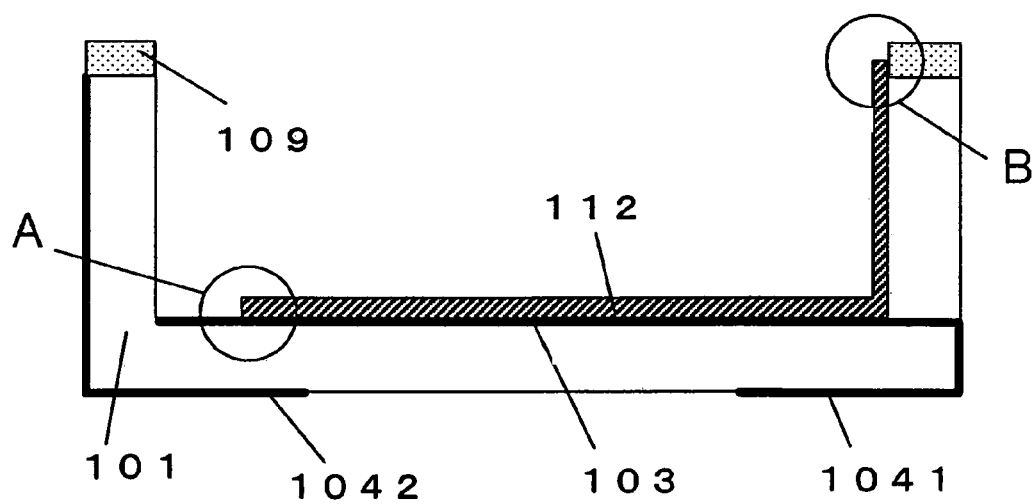
FIG. 8 is a cross-sectional diagram of a container of a conventional electrochemical cell.

Further, depending on conditions of forming the covering portion, a defect is sometimes generated in the covering portion. Particularly, when the covering portion is in the vicinity of a side wall of the container 101, the defect is liable to be generated. An example of a film defect to be generated is shown in FIG. 8. As is shown by A in FIG. 8, there is a case in which a portion of the positive electrode current collector 103 is exposed or, as is shown by B therein, the covering portion comes in contact with the metallic ring 109. In a case in which, as is shown by A in FIG. 8, a portion of the positive electrode current collector is exposed, when the electrochemical cell is applied with voltage, a portion of the positive electrode current collector 103 is sometimes dissolved. Further, as is shown by B in FIG. 8, a formed film comes in contact with the metallic ring 109 to cause an internal short circuit in the electrochemical cell and, then, to nullify the function thereof. In order to prevent the internal short circuit from being generated, the positive electrode current collector in the vicinity of the side wall of the container is embedded in the container and the other portion thereof which is not embedded in the container is covered by the covering portion. A second alumina green sheet in square form in which a circular hole is provided in the center is provided. By such disposition, an area of the positive electrode current collector can be limited. A portion of the positive electrode current collector 103 is embedded in the container 101 and a remaining portion of the positive electrode current collector is exposed.

Figure 4:
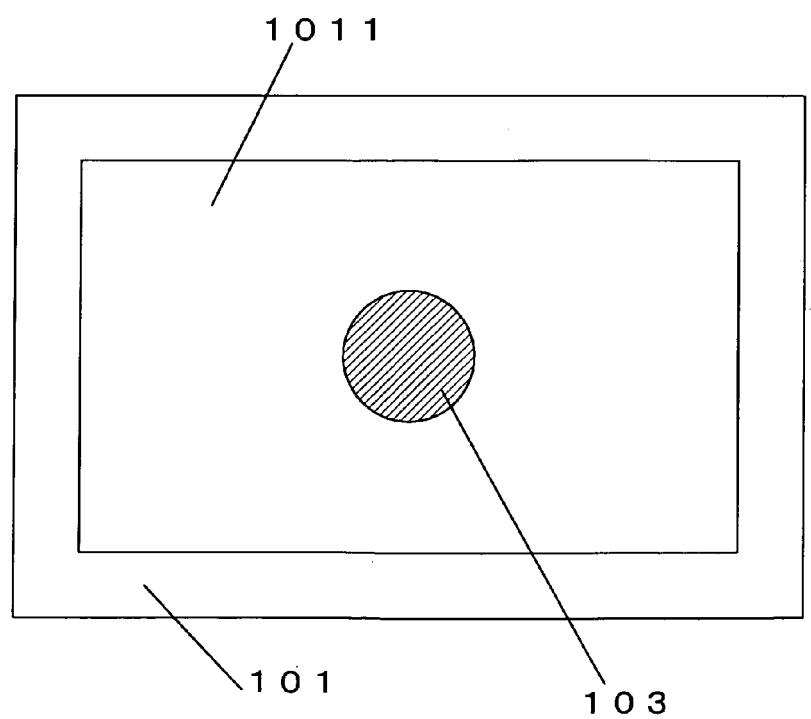
FIG. 4 is a view seen from top of a container of an electrochemical cell according to the present invention.

Further, an alumina green sheet which becomes an outer wall of the container 101 is provided. A view seen from the top of the container 101 in such configuration as described above is shown in FIG. 4 and an area of the positive electrode current collector 103 which is exposed becomes smaller than an area of a bottom face 1011 of the container. On this occasion, it is not necessary that the positive electrode current collector 103 has a same shape as that of a hole of the second alumina green sheet in square form, but may have such a shape as can electrically be connected with the covering portion 112 which is to be provided in a post-process. For example, it may be in a line shape or a band shape. The positive electrode current collector 103 and the positive electrode 106 are electrically connected to each other via the covering portion 112. It is not necessary that a shape of the hole of the second alumina green sheet in square form is circular.

Figure 5:
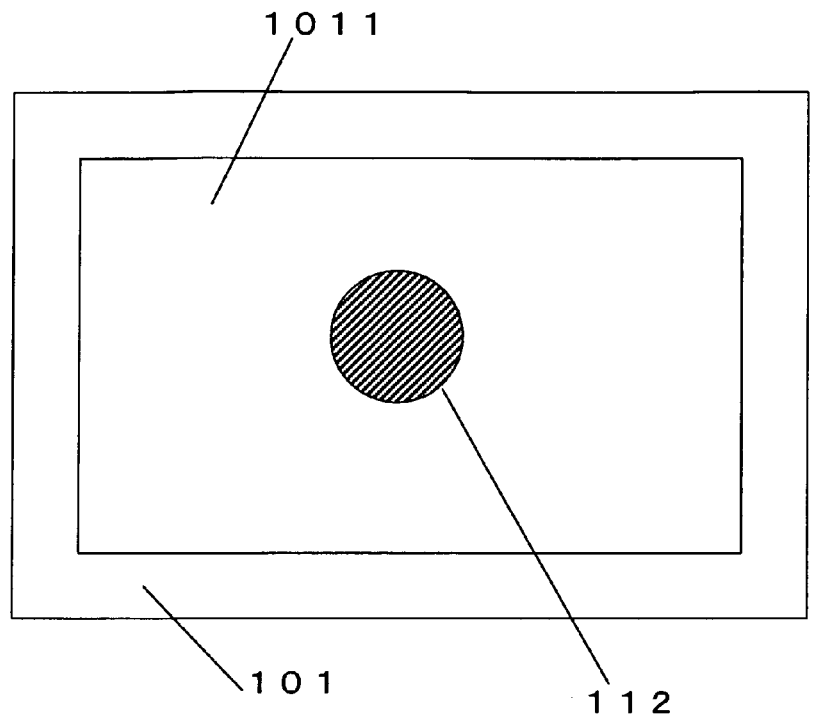
FIG. 5 is a view seen from top of a container with a covering portion formed thereon of an electrochemical cell according to the present invention.

Next, wiring yet to be performed of each of the connecting terminal A 1041 and the connecting terminal B 1042 is provided on the outer wall of the container 101 and, then, fired to obtain a final container 101. Further, the metallic ring 109 is joined to the resultant container 101. The covering portion 112 is provided on a surface of the positive electrode current collector 103. A view seen from top of such configuration is shown in FIG. 5. The positive electrode 106 is adhered by using the electrically conductive adhesive. On the side of the positive electrode, although the covering portion 112 is smaller than the positive electrode 106, since the electrically conductive adhesive 1111 is applied in a nearly same size as that of the positive electrode 106, a flow of electrons of each of the electrode active material and collector is not hampered, to thereby cause no deterioration of characteristics of the electrochemical cell such as an increase of an internal resistance. Further, the collector and the positive electrode 106 are not necessarily adhered to each other and they may only be placed on a bottom portion of the container 101 which has previously been coated with the electrically conductive adhesive 1111.

The lid 102 and the negative electrode 107 are previously adhered to each other by an electrically conductive adhesive 1112 containing carbon.

The metallic ring 109 is electrically connected to the connecting terminal B 1042 by means of a tungsten layer running along the outer wall as shown in FIG. 2.

A portion of the lid 102 on the side of the container is subjected to nickel plating which becomes a joining material.

The positive and negative electrodes, the separator 105, the electrolyte 108 are stored inside the container 101 and, then, the container 101 is capped by the lid 102 and, thereafter, subjected to welding by using a parallel seam welder which makes use of a theory of resistance welding such that a plurality of sets of two sides opposing to each other of the lid 102 are welded by such two sides at a time. By performing such welding method, highly reliable sealing can be obtained.

Figure 6:
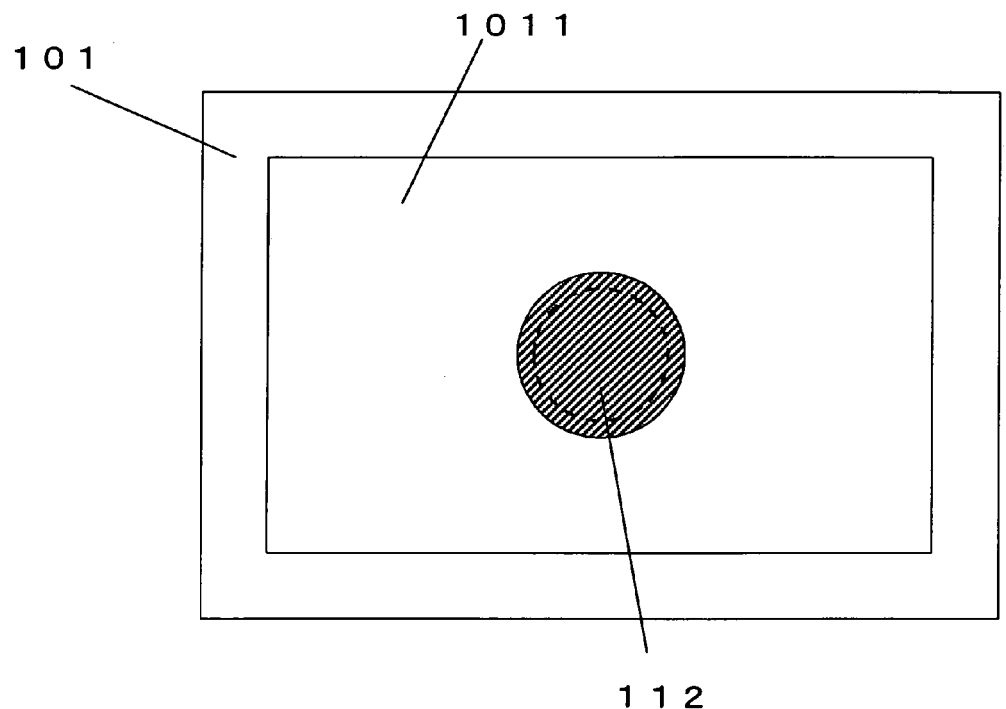
FIG. 6 is a view seen from top of a container 101 according to the present invention with a covering portion 112 formed thereon.
Figure 7:
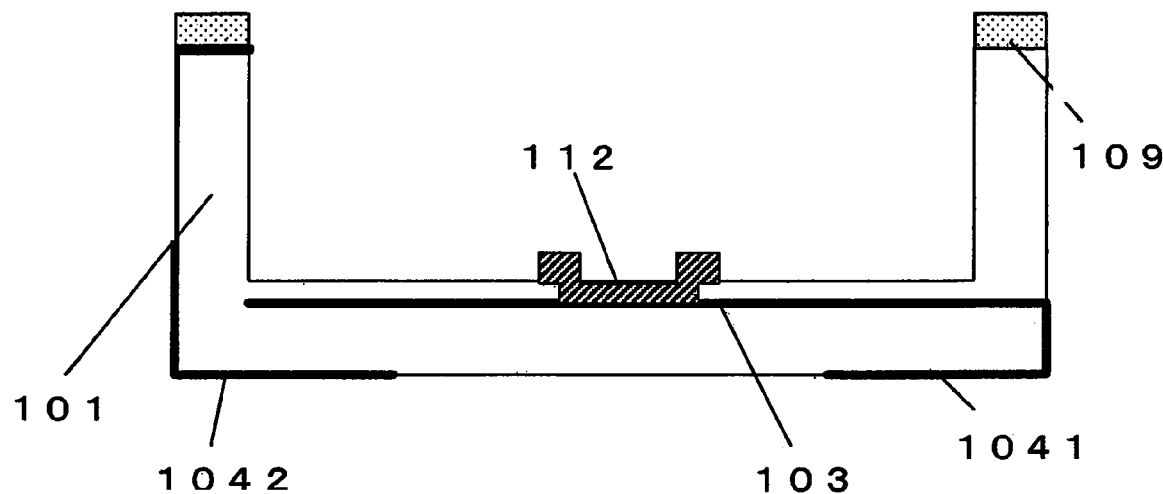
FIG. 7 is a cross-sectional diagram in a case in which a covering portion 112 is formed on a container 101 according to the present invention.

It is preferable that the covering portion 112 completely covers a hole provided in the bottom face of the container 101. A view seen from top of such configuration and a cross-section thereof are shown in FIGS. 6 and 7, respectively. By completely covering a portion of the positive electrode current collector 103 which is not embedded by means of the covering portion 112, an incidence that the positive electrode current collector 103 is exposed due to a defect to be generated at the time of forming the covering portion 112 or the like will not occur. For this account, reliability of the electrochemical cell is remarkably enhanced.

When the covering portion 112 is unduly large, an electrically conductive body is stuck to an inside of the outer wall of the container 101 and, then, comes in contact with the metallic ring 109 or the joining material, or electrode active materials come in contact with each other, to thereby cause a formation of an internal short circuit.

The container 101, which is made of ceramics, can use ceramics having a high strength and an insulating property such as alumina and zirconia. As for machining methods, a method in which green sheets pressed out in a predetermined shape are lapped one on top of another and, then, fired is effective in forming the positive electrode current collector 103, the connecting terminal A 1041 and the connecting terminal B 1042.

The positive electrode current collector 103, the connecting terminal A 1041 and the connecting terminal B 1042 are subjected to wiring by using tungsten print containing tungsten powder and, then, fired. The positive electrode current collector 103 and the connecting terminal A 1041 are connected to each other.

By using tungsten in the positive electrode current collector, thermal resistance of the positive electrode current collector is enhanced and, further, by using the tungsten print, the container and a tungsten positive electrode current collector can easily be produced at the same time. In a case in which the container of ceramics is prepared by firing at a high temperature, since the positive electrode current collector is also subjected to a high temperature, tungsten, molybdenum, chromium, or alloys thereof which area thermally resistant metal is effective. Other thermally resistant metals such as molybdenum can also be used. However, from the standpoint of reliability of wiring, tungsten is advantageous.

When the electrochemical cell is used at a relatively high voltage such as around 3 V, there is a problem in that the positive electrode current collector is dissolved, to thereby remarkably deteriorate characteristics thereof.

Then, the covering portion 112 is formed on a surface of the positive electrode current collector 103 comprising tungsten and, then, prevents the positive electrode current collector from being dissolved. In the covering portion 112, aluminum, tantalum, niobium, titanium, hafnium or zirconium which is referred to as a valve metal, or carbon is used. Particularly, aluminum is a material of low cost and easy handling. When any one of these materials is used, even when a potential of 4 V/vsLi or more at a Li counter electrode is applied to the covering portion 112, it is not dissolved.

As for forming methods thereof, there are vapor-deposition, sputtering, CVD, thermal spraying and the like. When aluminum is used, the thermal spraying or plating by using a normal-temperature molten-salt (butyl pyridinium chloride bath, imidazolium chloride bath) can be utilized. According to the present invention, since an area of the positive electrode current collector 103 is small, the covering portion 112 can be formed by least generating a defect in a case of the plating, or requiring no masking or simple masking in a case of the vapor-deposition, sputtering, CVD or thermal spraying.

It is desirable that a material for the metallic ring 109 has a thermal expansion coefficient near to that of the container 101. For example, when the container 101 uses alumina having a thermal expansion coefficient of $6.8 \times 10^{-6}/°$ C., it is desirable that KOVAR® having a thermal expansion coefficient of $5.2 \times 10^{-6}/°$ C. is used as the metallic ring.

Further, it is desirable that the lid 102 also uses KOVAR® in a same manner as the metallic ring, in order to enhance reliability of post-welding. The reason is that, at the time the lid 102 which has been subjected to welding is mounted on a surface of a substrate of a device, namely, at the time reflow soldering is performed, the lid 102 is heated again.

In order to solder portions of the connecting terminal A 1041 and the connecting terminal B 1042 to a substrate, surfaces thereof are preferably provided with a layer of nickel, gold, tin or solder. An edge portion of the container 101 is also preferably provided with a layer of nickel, gold or the like which is compatible with the joining material. As for methods for forming the layer, plating, a vapor-phase method such as vapor-deposition and the like are mentioned.

It is effective to provide a layer of nickel and/or gold as the joining material on a surface of each of the metallic ring 109 and the lid 102 to be joined. The reason is that, although a melting point of gold is 1063° C. and a melting point of nickel is 1453° C., a melting point of an alloy thereof can be reduced to be 1000° C. or less. As for methods for forming the layer, plating, a vapor phase method such as vapor-deposition, a thick-film forming method such as printing are mentioned. Particularly, plating and the thick-film forming method using printing are advantageous from the standpoint of cost.

However, it is necessary to allow impurities such as P, B, S, N and C in the layer of the joining material to be 10% or less. Particularly, when the plating is used, it is required to pay an attention. For example, in non-hydrolysis plating, P is liable to be transferred from a reducing agent, sodium hypophosphite, into the layer and B from dimethylamine borane thereinto. Further, in hydrolysis plating, since impurities are possibly transferred from an additive of a brightening agent or an anionic ion thereinto, it is necessary to pay an attention. It is necessary to suppress an amount of impurities to be 10% or less by adjusting amounts of the reducing agent, additive and the like. When the amounts of impurities come to be 10% or more, an intermetallic compound is formed on a joining face, to thereby cause a crack.

When nickel is used as a joining material on the side of the lid 102, gold is preferably used as the joining material on the side of the container 101. A ratio between gold and nickel may be in the range of from 1:2 to 1:1 and a welding temperature is decreased as a melting point of the alloy is decreased, to thereby enhance a joining property.

In welding of the joining portion, seam welding making use of a resistance welding method can be utilized. After the lid 102 and the container 101 are temporarily fixed to each other by spot welding, two sides of the lid 102 opposing to each other are pressed by corresponding roller-type electrodes opposing to each other and, then, energized, to thereby perform welding on the basis of the resistance welding. By welding four sides of the lid 102, sealing can be performed. Since a current is allowed to flow in a pulse state while the roller-type electrodes are rotated, the joining portion appears to be in seam form after subjected to welding. Unless an appropriate control is performed such that individual welding marks by pulse are overlapped with one another, a complete sealing can not be realized.

When welding is performed on a cell or a capacitor which contains an electrolyte (liquid), the seam welding making use of a resistance welding method is particular preferred.

The separator to be used is preferably a thermally resistant non-woven fabric. For example, although the separator such as a roll-pressed porous film or the like has a thermal resistance, it shrinks in a direction of roll-pressing by heat to be applied at the time of seam welding making use of the resistance welding method and, as a result, an internal short circuit is liable to be generated. The separator using a thermally resistant resin or glass fibers shrinks to a small extent and is preferred. As for such resins, PPS (polyphenylene sulfide), PEEK (polyether ether ketone) are favorable. Particularly, the glass fibers are effective. Further, a porous body of ceramics can also be used.

A shape of the electrochemical cell according to the present invention is fundamentally free. A shape of a conventional electrochemical cell utilizing caulk sealing is almost limited to a circular shape. For this account, when such conventional cell is aligned with other electronic parts mostly in a square shape, a useless dead space is bound to be generated. Since the electrochemical cell according to the present invention can be designed to be in a square shape, it causes no projection of the terminal or the like and, therefore, it can efficiently be provided on the substrate.

Example 1

An electric double-layer capacitor was prepared by using a container 101 having a shape as shown in FIG. 2. Sizes of the container 101 were set as 3×5 mm and height thereof as 0.5 mm. Thickness of a portion of the container 101 which became an outer wall was set as 0.3 mm. A positive electrode current collector 103, a connecting terminal A 1041 and a connecting terminal B 1042 were subjected to wiring by using tungsten print. The positive electrode current collector 103 and the connecting terminal A 1041 were connected to each other. The positive electrode current collector 103 was allowed to be in a circular shape having a diameter of 1.0 mm and was constituted such that an area thereof was substantially smaller than that of a bottom face 1011 of the container 101. A metallic ring 109 made of KOVAR® having a thickness of 0.15 mm was previously joined to a top portion of the container 101 by using a gold-type brazing material and, accordingly, height of the outer wall of the container 101 came to be 0.4 mm.

A portion of a metal of the container 101 which was exposed was subjected to nickel plating and, then, to gold plating. After such gold plating is performed, a covering portion 112 was formed by performing melt-spraying of aluminum. As for a lid 102, a KOVAR® sheet having sizes of 2×4 mm and a thickness of 0.15 mm which has previously been subjected to nickel plating was used.

As for each of a positive electrode 106 and a negative electrode 107, an activated carbon sheet having sizes of 2×4 mm and a thickness of 0.15 mm was used. The positive electrode 106 was adhered to a bottom portion of the container 101 by using an electrically conductive adhesive 1111, while the negative electrode 107 was adhered to the lid 102 by using an electrically conductive adhesive 1112. Next, a separator 105 was placed on the positive electrode 106 and, then, 5 μL of an electrolyte in which 1 mol/L of $(C_2H_5)_4NBF_4$ was added to propylene carbonate (PC) was added thereto. The lid 102 which has previously been adhered to the negative active material 107 was placed on the container 101 and, then, the lid 102 and the container 101 were temporarily fixed to each other by performing spot welding and, thereafter, roller-type electrodes opposing to each other were pressed against two sides of the lid 102 opposing to each other and, then, energized, to perform seam welding based on a theory of resistance welding.

As for Comparative Example 1, an electric double-layer capacitor in which a hole was formed in a portion of a protective portion to allow the positive electrode current collector to be exposed was prepared. An electrode material, an electrolyte, a sealing method and the like are constituted in a same manner as in Example 1.

Figure 9:
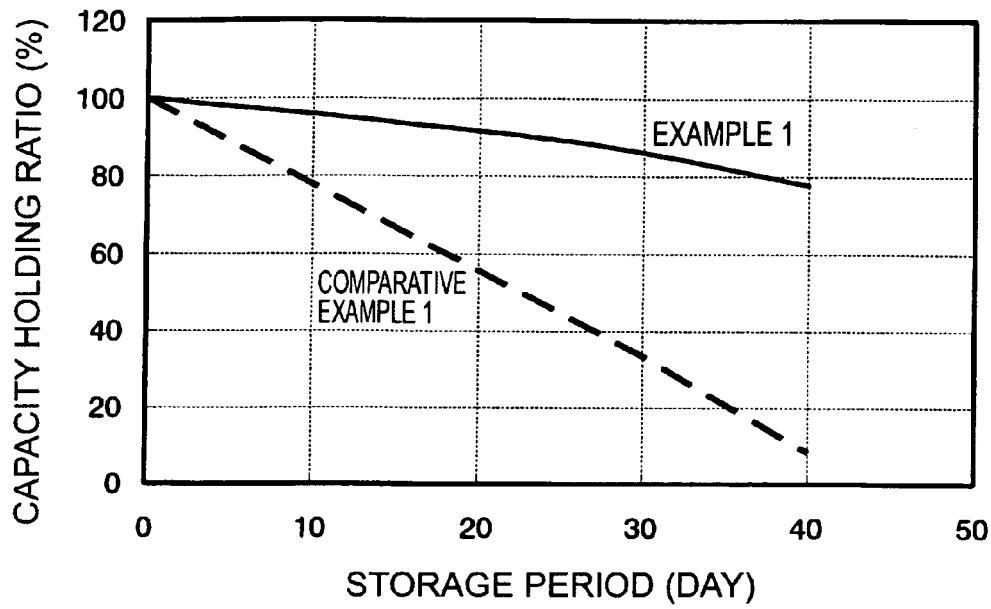
FIG. 9 is a graph showing movements of capacity holding ratios of Example 1 and Comparative Example 1.
Figure 10:
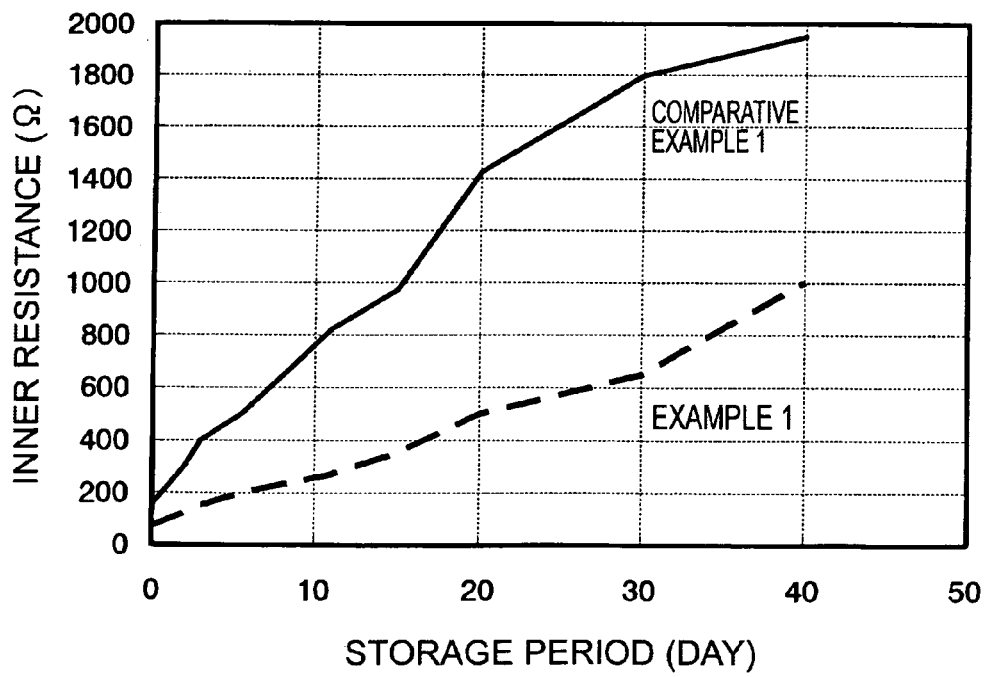
FIG. 10 is a graph showing movements of internal resistance of Example 1 and Comparative Example 1.

The electric double-layer capacitor of each of Example 1 and Comparative Example 1 was stored for predetermined days in a state in which it is applied with a voltage of 3.3 V at 70° C. and, then, movements of a capacity holding ratio and internal resistance thereof were measured to examine the extent of deterioration which has been made. The results are shown in FIGS. 9 and 10. In the test, it is ordinarily considered that a storage for 10 days at 70° C. corresponds to a one-year storage under normal conditions. In Example 1, even after 40 days of storage, the capacity holding ratio was 80% and the internal resistance was 1000Ω or less and, accordingly, the results were extremely favorable such that they have no problem in practical application. In contrast, in Comparative Example 1, the capacity holding ratio was largely decreased while the internal resistance was increased, to thereby find that deterioration occurred inside the electrochemical cell. When the electrochemical cell of Comparative Example 1 after the storage was decomposed and examined, a plurality of portions of the collector on the side of the positive electrode were dissolved. It is considered that such dissolution occurred due to the fact that the positive electrode current collector was not completely covered allowing a portion thereof to be exposed.

Example 2

Next, an embodiment in which a covering portion was formed by a different method is described. In a same manner as in Example 1, an electric double-layer capacitor was prepared by using a container 101 having a shape as shown in FIG. 2. Sizes of the container 101 were set as 3×5 mm and height thereof was set as 0.5 mm. Thickness of a portion of the container 101 which became an outer wall was set as 0.3 mm. A positive electrode current collector 103, a connecting terminal A 1041 and a connecting terminal B 1042 were subjected to wiring by using tungsten print. The positive electrode current collector 103 was allowed to be in a circular shape having a diameter of 1.0 mm and was constituted such that an area thereof was substantially smaller than that of a bottom face 1011 of the container 101. A metallic ring 109 made of KOVAR® having a thickness of 0.15 mm was previously joined to a top portion of the container 101 by using a gold-type brazing material and, accordingly, height of the outer wall of the container 101 came to be 0.4 mm.

The connecting terminals of the container 101 were subjected to nickel plating and, then, to gold plating.

Figure 11:
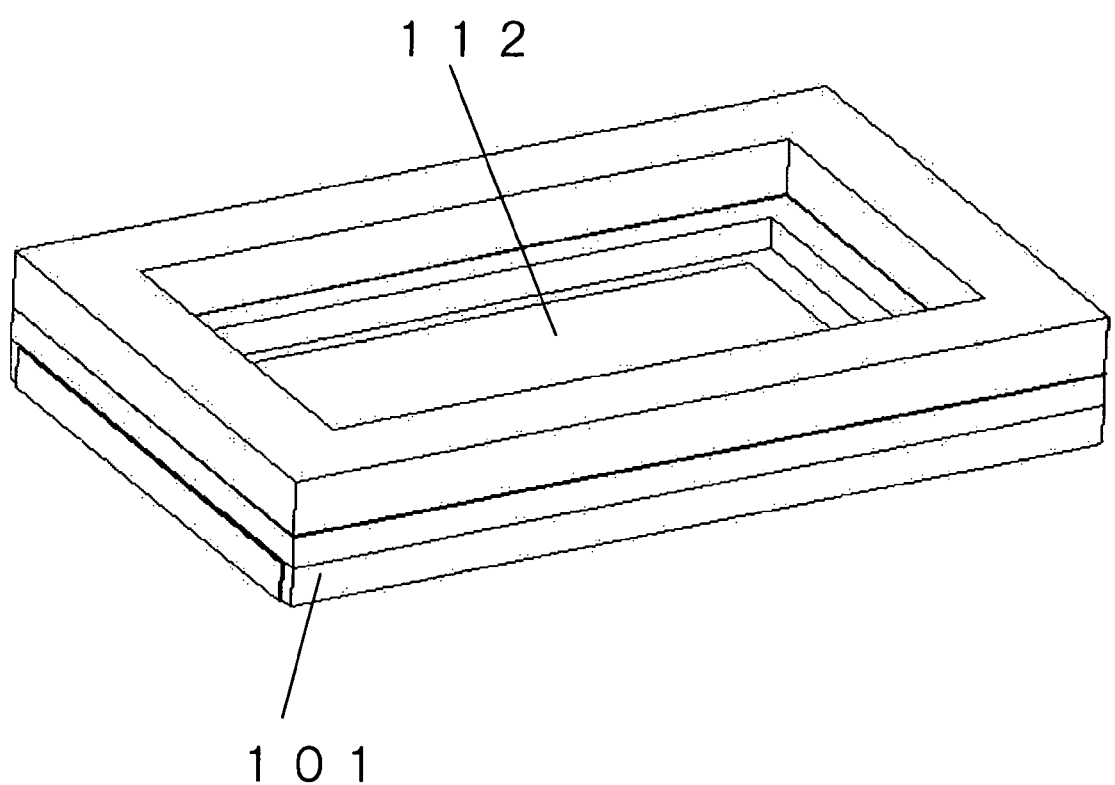
FIG. 11 is a perspective view in a case in which a covering portion 112 is formed on a container 101 according to the present invention.

Further, in forming the covering portion 112, a simple metallic mask (in a shape having a square opening corresponding to that of the container) was placed on the container 101 and, then, subjected to aluminum vapor-deposition. A perspective view of the container 101 in a state after the metallic mask was removed is shown in FIG. 11. The covering portion 112 was able to be formed in a square shape on the bottom face of the container 101. On this occasion, thickness of an aluminum vapor-deposited film was set as approximately 8 μm due to the fact that 8 μm was effective as the thickness of the aluminum vapor-deposited film. When the thickness thereof was 3 μm or less, a pin-hole was generated, to thereby find it difficult to maintain characteristics of the capacitor. Further, when it was 15 μm or more, it took a considerable amount of time to perform the vapor-deposition, which is unfavorable from the standpoint of production cost.

As for a lid 102, a KOVAR® sheet having sizes of 2×4 mm and a thickness of 0.15 mm which has been subjected to nickel plating was used.

In a same manner as in Example 1, as for each of a positive electrode 106 and a negative electrode 107, an activated carbon sheet having sizes of 2×4 mm and a thickness of 0.15 mm was used. The positive electrode 106 was adhered to a bottom portion of the container 101 by using an electrically conductive adhesive 1111, while the negative electrode 107 was adhered to the lid 102 by using an electrically conductive adhesive 1112. Next, a separator 105 was placed on the positive electrode 106 and, then, 5 μL of an electrolyte in which 1 mol/L of $(C_2H_5)_4NBF_4$ was added to propylene carbonate (PC) was added thereto. The lid 102 which has been adhered to the negative active material 107 was placed on the container 101 and, then, the lid 102 and the container 101 were temporarily fixed to each other by performing spot welding and, thereafter, roller-type electrodes opposing to each other were pressed against two sides of the lid 102 opposing to each other and, then, energized, to perform seam welding based on a theory of resistance welding.

In a same manner as in Example 1, the electric double-layer capacitor according to Example 2 was stored for predetermined days in a state in which it was applied with a voltage of 3.3 V at 70° C. and, then, movements of a capacity holding ratio and internal resistance thereof were measured to examine the extent of deterioration which has been made. The results were extremely favorable such that they had no problem in practical application in a same manner as in Example 1.

In the present Example, the electric double-layer capacitor has only been described, but same effect in storage was also noticed in a non-aqueous secondary cell. Further, even when it was applied with a voltage of 3.3 V or less, storage characteristics thereof were enhanced compared with those of a conventionally constituted one.

In the present Example, a case in which the covering portion 112 was made of aluminum has only been described; however, same effect was obtained when tantalum, niobium, titanium, hafnium or zirconium was used. Since aluminum is easily worked and advantageous in cost, the present Example which uses aluminum has been described.

The electrochemical cell according to the present invention has come to obtain a high reliability in storage by studying the shape and material of the collector on the side of the positive electrode. Particularly, since the electrochemical cell according to the present invention is steadfast against storage in a state of being applied with a voltage, it is optimum to use it for, for example, a memory back-up application.

DESCRIPTION OF REFERENCE NUMERALS AND SIGNS

101: container
1011: container bottom face
102: lid
103: positive electrode current collector
1041: connecting terminal A
1042: connecting terminal B
105: separator
106: positive electrode
107: negative electrode
108: electrolyte
109: metallic ring
1111: electrically conductive adhesive
1112: electrically conductive adhesive
112: covering portion

What is claimed is:

1. An electrochemical cell comprising:
a container containing a positive electrode, a negative electrode, and an electrolyte, the container having a bottom wall, a sidewall extending from the bottom wall, and a hole formed in the bottom wall;
a positive electrode current collector embedded in the bottom wall of the container so that the hole formed in the bottom wall exposes a portion of the positive electrode current collector;
a covering portion covering the bottom wall, or a portion of the bottom wall, but not the sidewall of the container so as to cover the exposed portion of the positive electrode current collector to prevent direct contact between the positive electrode and the positive electrode current collector, the covering portion being adhered to the positive electrode, and the positive electrode current collector being electrically connected to the positive electrode via the covering portion; and
a lid for sealing the container.

2. An electrochemical cell as set forth in claim 1; wherein the positive electrode current collector is made of molybdenum, chromium, or alloys thereof.

3. An electrochemical cell as set forth in claim 1; wherein the covering portion is made of a valve metal comprising one or more elements selected from the group consisting of aluminum, tantalum, niobium, titanium, hafnium and zirconium.

4. An electrochemical cell as set forth in claim 1; wherein the covering portion and the positive electrode are adhered to each other by an electrically conductive adhesive.

5. An electrochemical cell as set forth in claim 1; wherein the container is made of ceramics.

6. An electrochemical cell as set forth in claim 2; wherein the container is made of ceramics.

7. An electrochemical cell as set forth in claim 3; wherein the container is made of ceramics.

8. An electrochemical cell as set forth in claim 1; wherein the covering portion is made of carbon.

9. An electrochemical cell as set forth in claim 1; wherein the covering portion is made of a valve metal.

10. An electrochemical cell comprising:
a container containing a positive electrode, a negative electrode, and an electrolyte, the container having a bottom wall, a sidewall extending from the bottom wall, and a hole formed in the bottom wall;
a positive electrode current collector embedded in the bottom wall of the container so that the hole formed in the bottom wall exposes a portion of the positive electrode current collector;
a covering portion made of aluminum and covering the bottom wall, or a portion of the bottom wall, but not the sidewall of the container so as to cover the exposed portion of the positive electrode current collector to prevent direct contact between the positive electrode and the positive electrode current collector, the covering portion being adhered to the positive electrode, and the positive electrode current collector being electrically connected to the positive electrode via the covering portion; and
a lid for sealing the container.

11. An electrochemical cell comprising:
a container containing a positive electrode, a negative electrode, and an electrolyte, the container having a bottom wall and a sidewall extending from the bottom wall;
a positive electrode current collector electrically connected to the positive electrode, the positive electrode current collector being embedded in bottom wall of the container to prevent direct contact thereof with the positive electrode except for a preselected portion of the positive electrode current collector that remains exposed to the bottom wall of the container;
means adhered to the positive electrode for covering the bottom wall, or a portion of the bottom wall, but not the sidewall of the container so as to cover the exposed preselected portion of the positive electrode current collector to prevent direct contact between the exposed preselected portion of the positive electrode current collector and the positive electrode; and
a lid that seals the container.

12. An electrochemical cell as set forth in claim 11; wherein the means for covering the exposed preselected portion of the positive electrode current collector comprises a covering portion that covers and is disposed in direct contact with the exposed preselected portion of the positive electrode current collector.

13. An electrochemical cell as set forth in claim 12; wherein the covering portion is made of carbon.

14. An electrochemical cell as set forth in claim 12; wherein the covering portion is made of a valve metal.

15. An electrochemical cell as set forth in claim 14; wherein the valve metal comprises one or more elements selected from the group consisting of aluminum, tantalum, niobium, titanium, hafnium and zirconium.

16. An electrochemical cell comprising:
a container containing a positive electrode, a negative electrode, and an electrolyte, the container having a bottom wall and a sidewall extending from the bottom wall;
a positive electrode current collector electrically connected to the positive electrode, the positive electrode current collector being embedded in bottom wall of the container to prevent direct contact thereof with the positive electrode except for a preselected portion of the positive electrode current collector that remains exposed to the bottom wall of the container;
means for covering the bottom wall, or a portion of the bottom wall, but not the sidewall of the container so as to cover the exposed preselected portion of the positive electrode current collector to prevent direct contact between the exposed preselected portion of the positive electrode current collector and the positive electrode; and
a lid that seals the container;
wherein the means for covering the exposed preselected portion of the positive electrode current collector comprises a covering portion that is adhered to the positive electrode and that is made of aluminum and that covers and is disposed in direct contact with the exposed preselected portion of the positive electrode current collector.

17. An electrochemical cell as set forth in claim 11; wherein the positive electrode current collector is made of molybdenum, chromium, or alloys thereof.

18. An electrochemical cell as set forth in claim 11; wherein the container is made of ceramics.

19. An electrochemical cell as set forth in claim 1; wherein the hole formed in the bottom wall of the container does not expose the positive electrode.

20. An electrochemical cell as set forth in claim 10; wherein the hole formed in the bottom wall of the container does not expose the positive electrode.

21. An electrochemical cell as set forth in claim 10; wherein the container is made of ceramics.

22. An electrochemical cell as set forth in claim 11; further comprising a hole formed in the bottom wall of the container, the positive electrode current collector being embedded in the bottom wall of the container so that the hole formed in the bottom wall exposes a portion of the positive electrode current collector but does not expose the positive electrode.

23. An electrochemical cell as set forth in claim 16; further comprising a hole formed in the bottom wall of the container, the positive electrode current collector being embedded in the bottom wall of the container so that the hole formed in the bottom wall exposes a portion of the positive electrode current collector but does not expose the positive electrode.

24. An electrochemical cell as set forth in claim 16; wherein the container is made of ceramics.

* * * * *